(12) United States Patent
Chang et al.

(10) Patent No.: US 7,933,749 B2
(45) Date of Patent: Apr. 26, 2011

(54) SYSTEM AND METHOD FOR COMPUTING MINIMUM DISTANCES BETWEEN TWO POINT CLOUDS

(75) Inventors: Chih-Kuang Chang, Taipei Hsien (TW); Xin-Yuan Wu, Shenzhen (CN); Hua Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 535 days.

(21) Appl. No.: 12/056,238

(22) Filed: Mar. 26, 2008

(65) Prior Publication Data

US 2009/0063105 A1 Mar. 5, 2009

(30) Foreign Application Priority Data

Aug. 29, 2007 (CN) .......................... 2007 1 0201511

(51) Int. Cl.
*G06F 7/60* (2006.01)
*G06F 17/10* (2006.01)
(52) U.S. Cl. .......................................... 703/2; 382/154
(58) Field of Classification Search ....... 703/2; 382/154
See application file for complete search history.

(56) References Cited

U.S. PATENT DOCUMENTS

| | | | | |
|---|---|---|---|---|
| 5,903,458 A * | 5/1999 | Stewart et al. | ............... | 700/98 |
| 6,285,372 B1 * | 9/2001 | Cowsar et al. | ............... | 345/420 |
| 6,516,099 B1 * | 2/2003 | Davison et al. | ............... | 382/284 |
| 6,920,242 B1 * | 7/2005 | Moore et al. | ............... | 382/154 |
| 6,974,373 B2 * | 12/2005 | Kriesel | ............... | 452/157 |
| 6,996,505 B1 * | 2/2006 | Edelsbrunner et al. | ............... | 703/2 |
| 7,047,151 B2 * | 5/2006 | Chang | ............... | 702/152 |
| 7,065,461 B2 * | 6/2006 | Chang et al. | ............... | 702/81 |
| 7,602,963 B2 * | 10/2009 | Nightingale et al. | ............... | 382/149 |
| 7,683,900 B2 * | 3/2010 | Chang et al. | ............... | 345/419 |
| 2003/0067461 A1 * | 4/2003 | Fletcher et al. | ............... | 345/420 |
| 2003/0137646 A1 * | 7/2003 | Hoffman et al. | ............... | 356/4.01 |
| 2004/0001620 A1 * | 1/2004 | Moore et al. | ............... | 382/154 |
| 2004/0027347 A1 * | 2/2004 | Farsaie | ............... | 345/419 |
| 2005/0146522 A1 * | 7/2005 | Maillot | ............... | 345/423 |
| 2005/0246130 A1 * | 11/2005 | Spicer et al. | ............... | 702/152 |
| 2006/0098008 A1 * | 5/2006 | Holberg | ............... | 345/420 |
| 2006/0116838 A1 * | 6/2006 | Chang et al. | ............... | 702/98 |
| 2007/0124107 A1 * | 5/2007 | Numata et al. | ............... | 702/168 |
| 2007/0265727 A1 * | 11/2007 | Bae et al. | ............... | 700/182 |
| 2007/0285425 A1 * | 12/2007 | Bae et al. | ............... | 345/427 |

* cited by examiner

*Primary Examiner* — Dwin M Craig
(74) *Attorney, Agent, or Firm* — Frank R. Niranjan

(57) ABSTRACT

A method for computing minimum distances between two point clouds is provided. The method includes: (a) acquiring a first point cloud and a second point cloud; (b) establishing a topological structure for the second point cloud to make points of the second point cloud confined in a plurality of related cubical grids; (c) selecting a point from the first point cloud; (d) searching one or more cubical grids from the related cubical grids according to the topological structure and computing a distance between the selected point and each of points which belong to the second point cloud and in the searched cubical grids to obtain a closest point from the second point cloud, which has a shortest distance to the selected point; (e) repeating steps from (c) to (d) until all the points in the first point cloud have been selected. A related system is also provided.

6 Claims, 7 Drawing Sheets

US 7,933,749 B2

SYSTEM AND METHOD FOR COMPUTING MINIMUM DISTANCES BETWEEN TWO POINT CLOUDS

BACKGROUND OF THE INVENTION

1. Field of the Invention

The present invention relates to systems and methods for computing distances, particularly to a system and a method for computing minimum distances between two point clouds.

2. Description of Related Art

In recent years, with continuous improvement of computer hardware and software, computers play a major role in a point cloud processing system. The point cloud processing system generally includes: a point cloud obtaining device for obtaining point cloud of an object and inputting the point cloud to a computer; a computer for executing software to process the point cloud, such as Computer Aided Verification (CAV), Reverse Engineering (RE), and so on.

During processing the point cloud, different distances usually need to be computed, for example, minimum distances between two point clouds. The minimum distances between two point clouds mean a gather of a distance between each point of a first point cloud and a nearest point (which is nearest to the point of the first point cloud) of a second point cloud. In order to compute the minimum distances between two point clouds, a conventional method is used. The conventional method can be described as: computing distances between each point in the first point cloud and each point in the second point cloud for getting the shortest distances. Usually, a quantity of the points in the point cloud may be hundreds of thousands, several million, even several billion. Thus, such conventional method of computing the minimum distances between two point clouds is becoming a severe inefficiency problem resulting in difficult, complex and time-consuming.

What is needed, therefore, is a method for computing the distances between two point clouds, which is capable of computing the minimum distances between two point clouds quickly and conveniently.

SUMMARY OF THE INVENTION

A computer-enabled method for computing minimum distances between two point clouds is provided. The method includes steps of: (a) acquiring a first point cloud and a second point cloud; (b) establishing a topological structure for the second point cloud to make points of the second point cloud confined in a plurality of related cubical grids; (c) selecting a point, which has not been selected, from the first point cloud; (d) searching one or more cubical grids from the related cubical grids according to the topological structure, and computing a distance between the selected point and each of points which belong to the second point cloud and in the searched cubical grids to obtain a closest point from the second point cloud, which has a shortest distance to the selected point, wherein the shortest distance is one of the minimum distances between the two point cloud; (e) repeating steps from (c) to (d) until all the points in the first point cloud have been selected.

Other advantages and novel features of the present invention will become more apparent from the following detailed description of preferred embodiment when taken in conjunction with the accompanying drawings, in which:

DETAILED DESCRIPTION OF THE INVENTION

Figure 1:
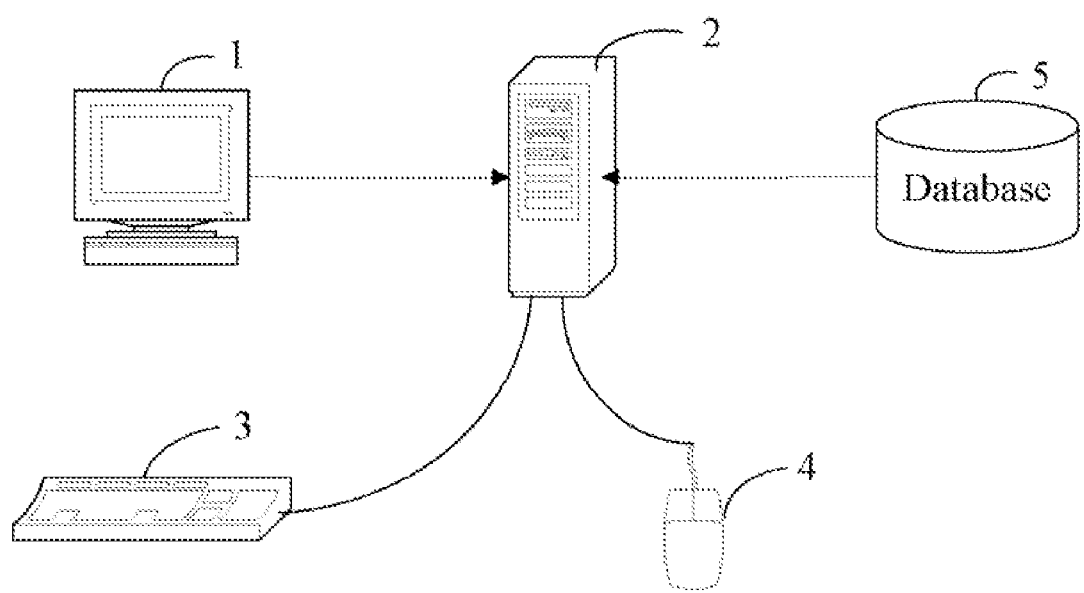
FIG. 1 is a schematic diagram of hardware configuration of a system for computing minimum distances between two point clouds in accordance with a preferred embodiment.

FIG. 1 is a schematic diagram of hardware configuration of a system for computing minimum distances between two point clouds (hereinafter, "the system") in accordance with a preferred embodiment. The system typically includes at least one client computer 1 (only one shown), an application server 2, a keyboard 3, and a mouse 4. The application server 2 is connected with a database 5.

The database 5 is mainly configured for storing a plurality of point clouds which are obtained by a point cloud obtaining device (not shown in FIG. 1), and also for storing data generated when processing the point clouds.

The application server 2 is mainly configured for acquiring the point clouds from the database 5. The application server 2 is installed with a plurality of software function modules that are mainly used for processing the point clouds to compute minimum distances between two point clouds. The at least one client computer 1 may be located at various locations (e.g., different internal departments) of an organization. Each client computer 1 provides a graphical user interface (GUI) for displaying the point clouds.

The keyboard 3 and the mouse 4 connect to the application server 2, and mainly configured for inputting data while processing the point clouds.

Figure 2:
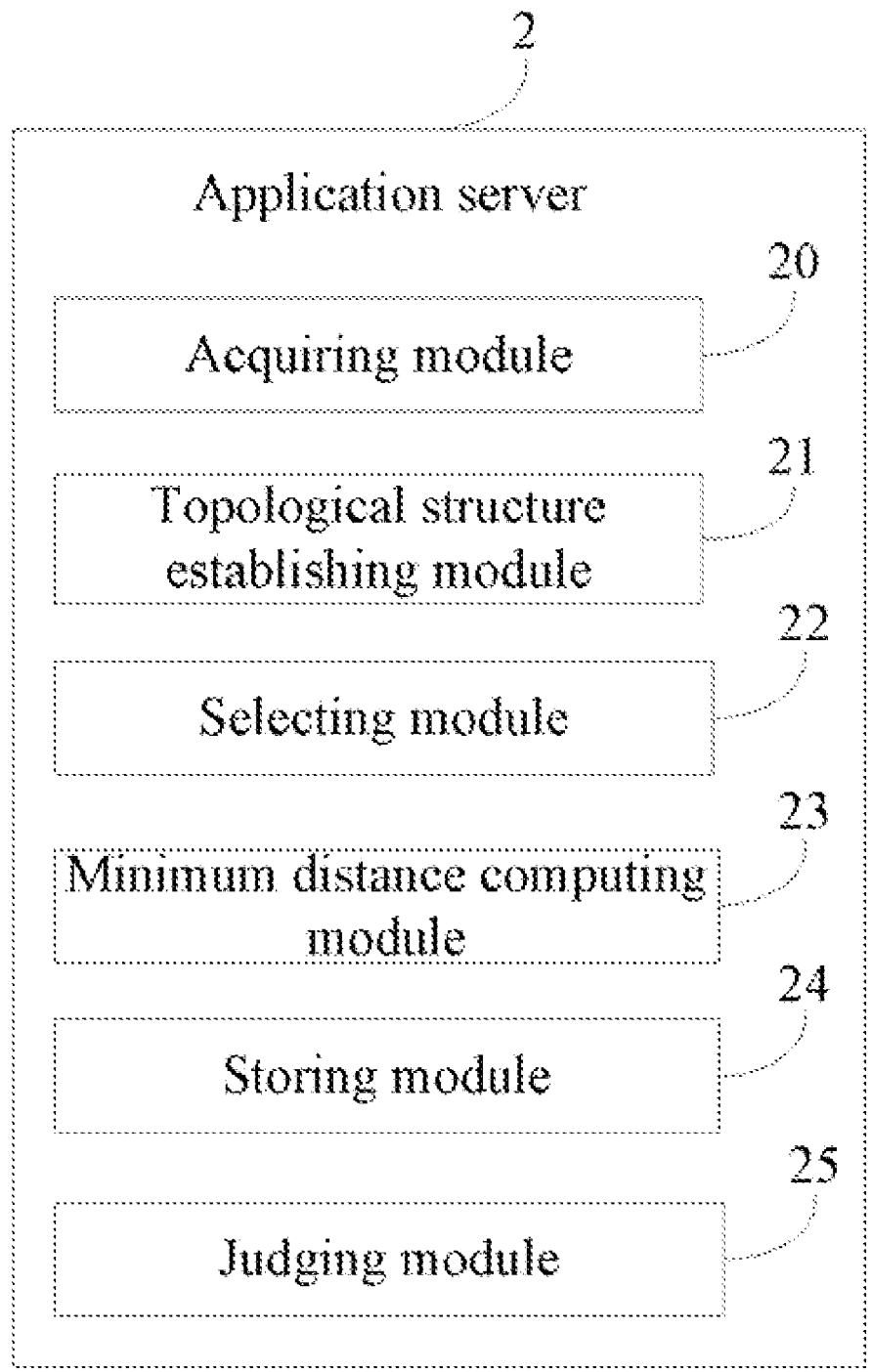
FIG. 2 is a block diagram of function modules of an application server in FIG. 1.

FIG. 2 is a block diagram of the function modules of the application server 2 in FIG. 1. The application server 2 typically includes: an acquiring module 20, a topological structure establishing module 21, a selecting module 22, a minimum distance computing module 23, a storing module 24, and a judging module 25.

The acquiring module 20 is mainly configured for acquiring the point clouds from the database 5. In the preferred embodiment, the acquiring module 20 acquires two point clouds from the database 5, namely a first point cloud and a second point cloud.

The topological structure establishing module 21 is mainly configured for establishing a topological structure for the second point cloud, namely constructing a relationship between the points of the second point cloud. Specifically, the topological structure establishing module 21 first identifies an outermost point on each surface edge of the second point cloud by analyzing coordinates values of the points in the second point cloud, and creates a cubical figure that can confine the second point cloud according to the outmost points. Then, the topological structure establishing module 21 derives a length, a width and a height of the cubical figure. Finally, the topological structure establishing module 21 divides the cubical figure into a plurality of cubical grids according to the length, the width, the height of the cubical figure and an axes interval "step" that is preconfigured by a user. Thus, the points in the second point cloud may be separately confined in different related cubical grids. According to the axes interval "step" preconfigured by the user and the density of the second point cloud, each cubical grid may confine one or more points. The topological structure establishing module 21 is further configured for configuring serial numbers for all the cubical grids to identify the cubical grids, for example, "001", "002", . . . , "xxx".

The selecting module 22 is mainly configured for selecting a point which has not been selected by the selecting module 22 (hereinafter, referred to as "selected point") from the first point cloud.

The minimum distance computing module 23 is mainly configured for computing distances between the selected point and the points in the second point cloud for obtaining a closest point from the second point cloud, which has a shortest distance to the selected point, according to the topological structure of the second point cloud. The shortest distance is one of the minimum distances between the two point clouds. Specifically, the minimum distance computing module 23 searches one or more cubical grids according to the topological structure of the second point cloud, and obtains the closest point by computing a distance between the selected point and each of points which belong to the second point cloud and in the searched cubical grids. The one or more cubical grids are searched by way of: computing a distance "D" from the selected point perpendicular to a plane of a closest side-surface of the cubical figure; and creating a measuring cube having a center of the selected point, and with a length of 2*(D+n*step), wherein n=n++, making the measuring cube cross with the cubical figure to form an intersection area, wherein the cubical grids of the intersection is the searched cubical grids;

The storing module 24 is mainly configured for storing the minimum distance and the closest point into the database 5.

The judging module 25 is mainly configured for determining whether all the points in the first point cloud have been selected by the selecting module 22. If at least one point in the first point cloud has not been selected, the selecting module 22 selects another point, which has not been selected, from the first point cloud.

Figure 3:
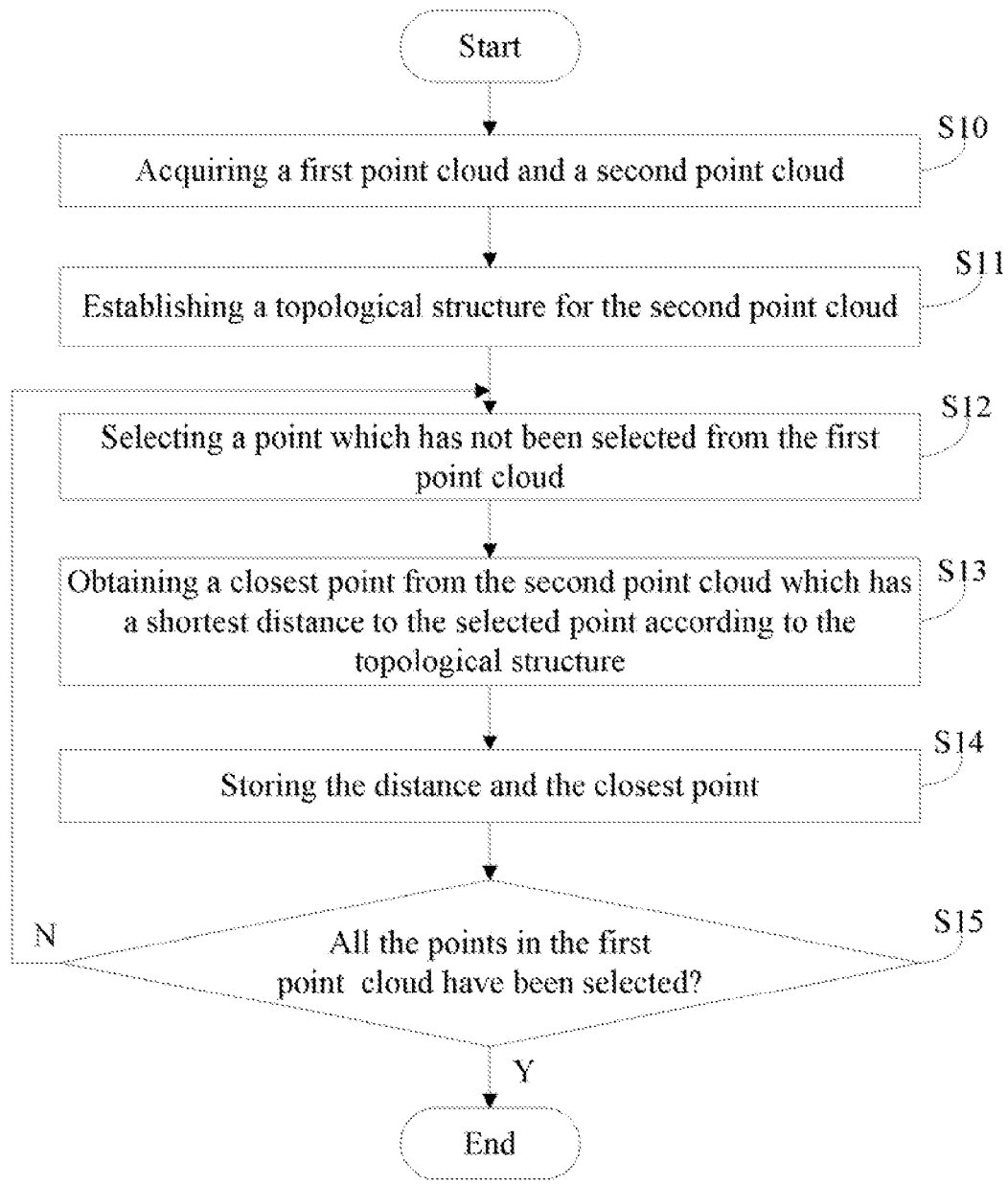
FIG. 3 is a main flowchart illustrating a method for computing minimum distances between two point clouds in accordance with a preferred embodiment.

FIG. 3 is a main flowchart illustrating a method for computing minimum distances between two point clouds in accordance with a preferred embodiment.

In step S10, the acquiring module 20 acquires a first point cloud and a second point cloud from the database 5.

Figure 4:
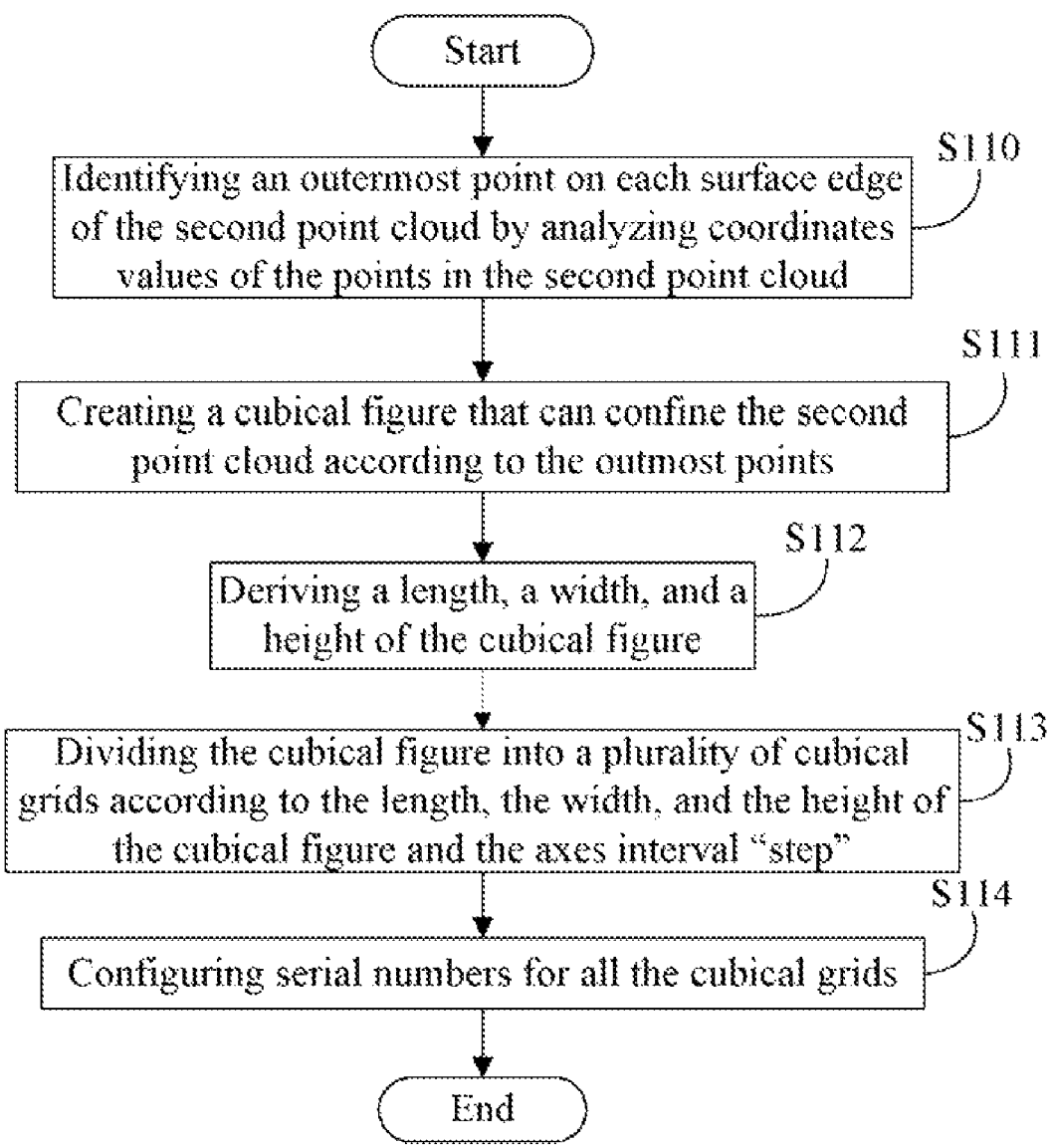
FIG. 4 is a detailed flowchart illustrating step S11 in FIG. 3.

In step S11, the topological structure establishing module 21 establishes a topological structure for the second point cloud, namely constructing a relationship between the points of the second point cloud. Detailed steps of establishing the topological structure for the second point cloud are depicted in FIG. 4.

In step S12, the selecting module 22 selects a point, which has not been selected, from the first point cloud.

Figure 5:
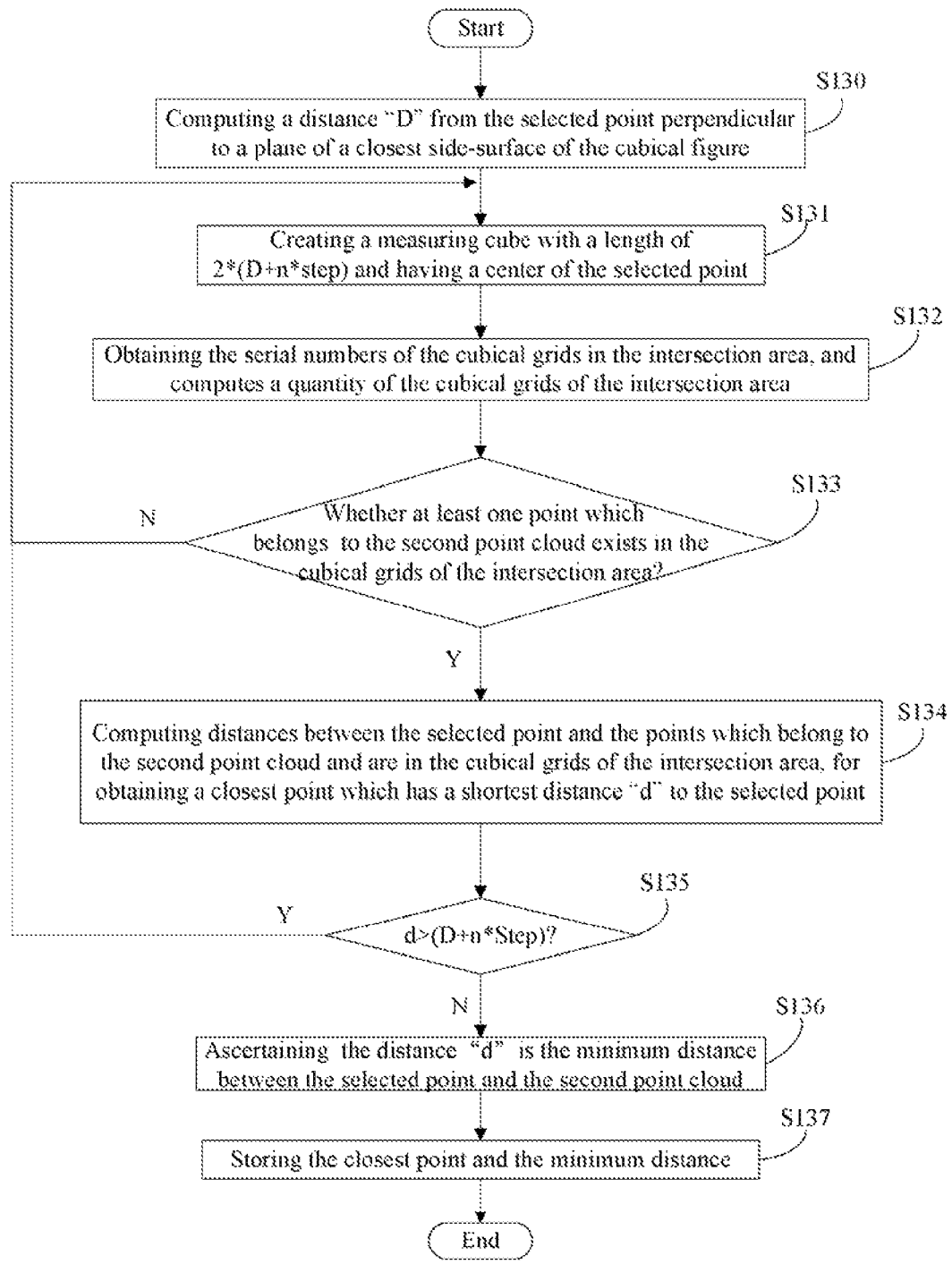
FIG. 5 is a detailed flowchart illustrating step S13 in FIG. 3.

In step S13, the minimum distance computing module 23 computes distances between the selected point and the points in the second point cloud according to the topological structure of the second point cloud, for obtaining a closest point from the second point cloud which has a shortest distance to the selected point. The shortest distance is one of the minimum distances between the two point clouds. Detailed steps of computing the distance are depicted in FIG. 5.

In step S14, the storing module 24 stores the minimum distance and the closest point into the database 5.

In step S15, the judging module 25 judges whether all the points in the first point cloud have been selected by the selecting module 22. If at least one point in the first point cloud has not been selected, the procedure returns to the step S12, the selecting module 22 selects another point, which has not been selected, from the first point cloud. Otherwise, if all points in the first point cloud have been selected, the procedure ends.

FIG. 4 is a detailed flowchart illustrating the step S11 in FIG. 3, namely how to establish a topological structure for the second point cloud.

In step S110, the topological structure establishing module 21 identifies an outermost point on each surface edge of the second point cloud by analyzing coordinates values of the points in the second point cloud. It is known that a point cloud has six surfaces in three-dimensional space, thus, the topological structure establishing module 21 can identify six outmost points.

In step S111, the topological structure establishing module 21 creates a cubical figure that can confine the second point cloud according to the outmost points. Specifically, the topological structure establishing module 21 first obtains a group of coordinate values $(Pt_{Min[x]}, Pt_{Min[y]}, Pt_{Min[z]})$ of the outmost point whose x-coordinate value, y-coordinate value and z-coordinate value are all minimum, and further obtains another group of coordinate values $(Pt_{Max[x]}, Pt_{Max[y]}, Pt_{Max[z]})$ of another outmost point whose x-coordinate value, y-coordinate value and z-coordinate value are all maximum. Then, the topological structure establishing module 21 obtains eight groups of coordinate values $(Pt_{Min[x]}, Pt_{Min[y]}, Pt_{Min[z]})$, $(Pt_{Min[x]}, Pt_{Min[y]}, Pt_{Max[z]})$, $(Pt_{Min[x]}, Pt_{Max[y]}, Pt_{Min[z]})$, $(Pt_{Min[x]}, Pt_{Max[y]}, Pt_{Max[z]})$, $(Pt_{Max[x]}, Pt_{Min[y]}, Pt_{Min[z]})$, $(Pt_{Max[x]}, Pt_{Max[y]}, Pt_{Min[z]})$, $(Pt_{Max[x]}, Pt_{Min[y]}, Pt_{Max[z]})$ and $(Pt_{Max[x]}, Pt_{Min[y]}, PtMin_{[z]})$ according to the coordinate values $(Pt_{Min[x]}, Pt_{Min[y]}, Pt_{Min[z]})$ and the coordinate values $(Pt_{Max[x]}, Pt_{Max[y]}, Pt_{Max[z]})$. Finally, the topological structure establishing module 21 creates a cubical figure with the vertexes of the eight groups of coordinate values.

In step S112, the topological structure establishing module 21 derives a length, a width, and a height of the cubical figure according to the eight groups of coordinate values.

In step S113, the topological structure establishing module 21 divides the cubical figure into a plurality of cubical grids according to the length, the width, and the height of the cubical figure and the axes interval "step" preconfigured by the user. Thus, the points in the second point cloud may be separately confined in different cubical grids.

In step S114, the topological structure establishing module 21 configures serial numbers for all the cubical grids to identify the cubical grids, for example, "001", "002", . . . , "xxx".

FIG. 5 is a detailed flowchart illustrating step S13 in FIG. 3, namely how to compute distance.

In step S130, the minimum distance computing module 23 computes a distance "D" from the selected point perpendicular to a plane of a closest side-surface of the cubical figure.

In step S131, the minimum distance computing module 23 creates a measuring cube having a center of the selected point and with a length of 2*(D+n*step), wherein n=n++, and the character "*" is a multiplication sign. Thus, the measuring cube crosses with the cubical figure forming an intersection area. The "n" appears in the length of the measuring cube is a number of how much times the measuring cube is created, herein n=1; and the "step" is the axes interval preconfigured by the user.

In step S132, the minimum distance computing module 23 obtains the serial numbers of the cubical grid in the intersection area, and computes a quantity of the cubical grids of the intersection area.

In step S133, the judging module 25 judges whether at least one point which belongs to the second point cloud exists in the cubical grids of the intersection area. If no such point exists in the cubical grids of the intersection area, the procedure returns to step S131, the minimum distance computing module 23 expands the measuring cube by creating a new measuring cube with an enlarge length of 2*(D+n*step) and still having a center of the selected point.

If at least one point which belongs to the second point cloud exists in the cubical grids of the intersection area, in step S134, the minimum computing module 23 computes distances between the selected point and the points which belong to the second point cloud and in the cubical grids of the intersection area for obtaining a closest point which has a shortest distance "d" to the selected point.

In step S135, the judging module 25 compares and judges whether d>(D+n*step) or not. If d≦(D+n*Step), in step S136, the minimum distance computing module 23 ascertains that the distance "d" is the minimum distance between the selected point and the second point cloud. In step S137, the storing module 24 stores the minimum distance "d" and the closest point into the database 5.

Otherwise, if d>(D+n*step), the procedure returns to step S131 described above, for expanding the measuring cube to form a bigger intersection area, until the minimum distance computing module 23 computes a shortest distance "d", which is less than or equal to the distance of (D+n*step).

Using the idea of computing minimum distance as described from FIG. 3 to FIG. 5, not only the minimum distances between two point clouds can be computed, but also minimum distances between a point cloud and a curved line, minimum distances between a point cloud and a curved surface, a minimum distance between two curved surface, and so on can be computed. In the below preferred embodiment, two flowcharts are provided to illustrate how to compute the minimum distances between a point cloud and a curved surface, and how to compute the minimum distance between two curved surfaces.

Figure 6:
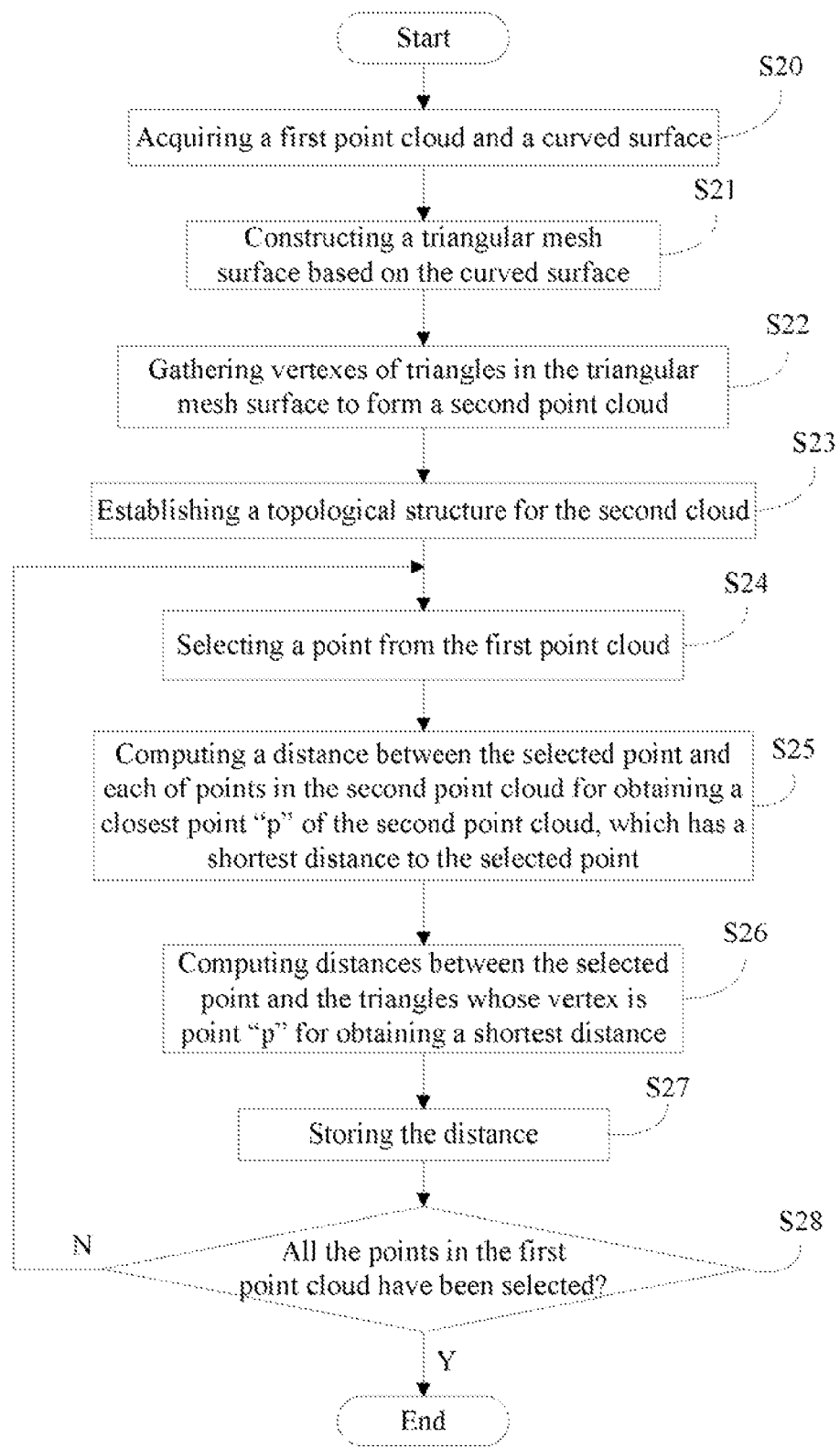
FIG. 6 is a flowchart illustrating a method for computing minimum distances between a point cloud and a curved surface in accordance with a preferred embodiment.

FIG. 6 is a flowchart illustrating a method for computing the minimum distances between a point cloud and a curved surface in accordance with a preferred embodiment.

In step S20, the acquiring module 20 acquires a first point cloud and a curved surface.

In step S21, the topological structure establishing module 21 constructs a mesh of triangular facets based on the curved surface. It is well known that the curved surface is composed of a plurality of triangles in microscopic view, thus, the topological structure establishing module 21 can construct the mesh of triangular facets by dividing the curved surface into the triangles.

In step S22, the topological structure establishing module 21 gathers vertexes of the triangles in the mesh of triangular facets to form a second point cloud.

In step S23, the topological structure establishing module 21 establishes a topological structure for the second point cloud. Specifically, the topological structure establishing module 21 creates a cubical figure that can confine the second point cloud, and divides the cubical figure into a plurality of cubical grids. The method of establishing the topological structure has been depicted in the FIG. 4 as described above.

In step S24, the selecting module 22 selects a point, which has not been selected, from the first point cloud.

In step S25, the minimum distance computing module 23 computes distances between the selected point and points in the second point cloud according to the topological structure for obtaining a closest point "p" from the second point cloud, which has a shortest distance to the selected point. The method of computing the distance has been depicted in FIG. 5 as described above.

In step S26, the minimum distance computing module 23 computes distances between the selected point and the triangles whose vertex is point "p" for obtaining a shortest distance. The shortest distance is one of the minimum distances between the point cloud and the curved surface.

In step S27, the storing module 24 stores the minimum distance. In step S28, the judging module 25 judges that whether all points in the first point cloud have been selected. If no, the procedure returns to step S23 depicted above. Otherwise, if all points in the first point cloud have been selected, the procedure ends.

Figure 7:
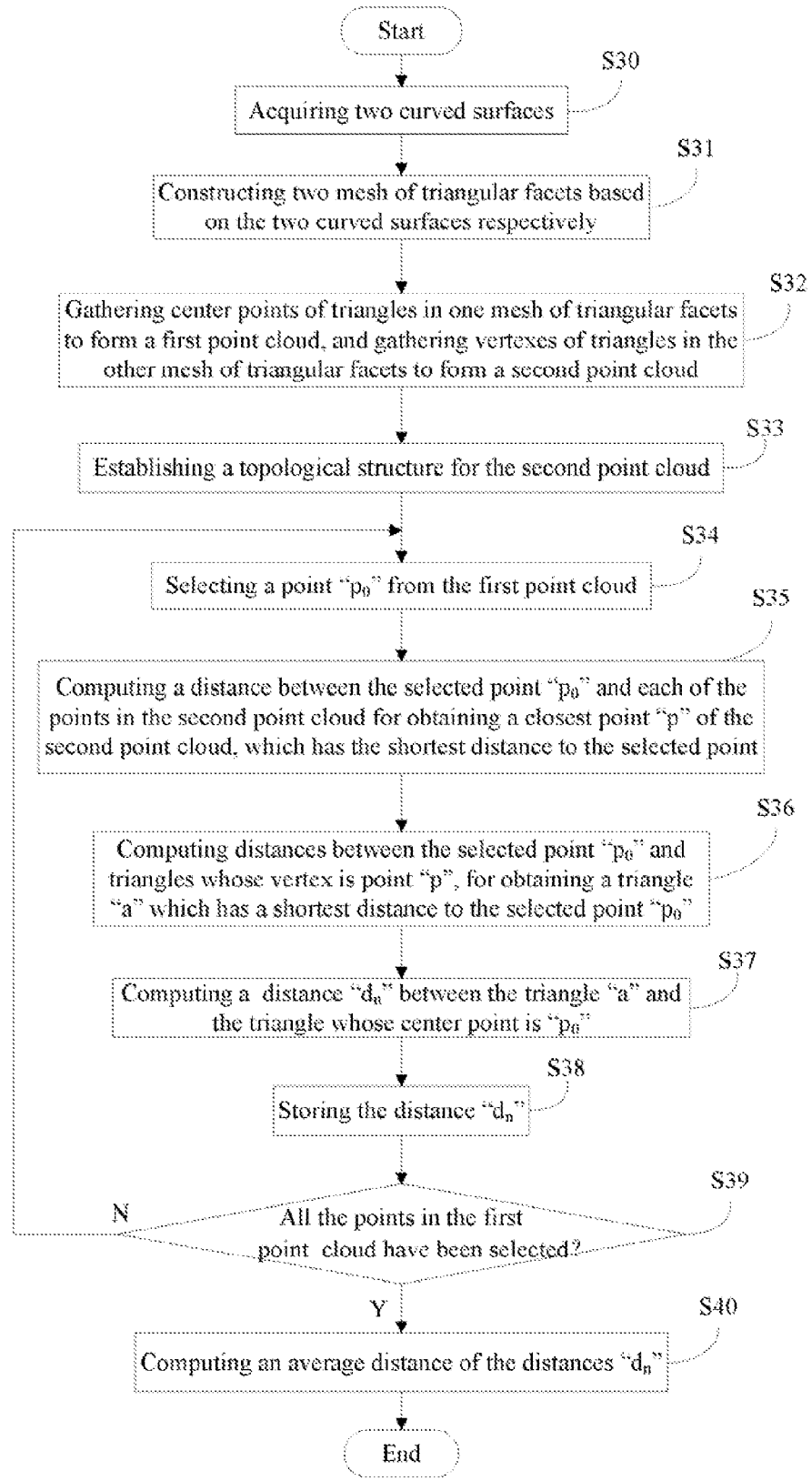
FIG. 7 is a flowchart illustrating a method for computing a minimum distance between two curved surfaces in accordance with a preferred embodiment.

FIG. 7 is a flowchart illustrating a method for computing the minimum distance between two curved surfaces in accordance with a preferred embodiment.

In step S30, the acquiring module 21 acquires two curved surfaces.

In step S31, the topological structure establishing module 21 constructs two mesh of triangular facets based on the two curved surfaces respectively.

In step S32, the topological structure establishing module 21 gathers center points of the triangles in one mesh of triangular facets to form a first point cloud, and gathers vertexes of the triangles in the other mesh of triangular facets to form a second point cloud.

In step S33, the topological structure establishing module 21 establishes a topological structure for the second point cloud. Specifically, the topological structure establishing module 21 creates a cubical figure that can confine the second point cloud, and divides the cubical figure into a plurality of cubical grids. The method of establishing a topological structure has been depicted in FIG. 4 as described above.

In step S34, the selecting module 22 selects a point "$p_0$", which has not been selected, from the first point cloud.

In step S35, the minimum distance computing module 23 computes distances between the selected point "$p_0$" and the points in the second point cloud according to the topological structure, for obtaining a closest point "p" from the second point cloud, which has the shortest distance to the selected point. The method of computing the distances between the selected point "$p_0$" and the points in the second point cloud according to the topological structure has been depicted in FIG. 5 as described above.

In step S36, the minimum distance computing module 23 computes distances between the selected point "$p_0$" and the triangles whose vertex is point "p", for obtaining a triangle "a" which has a shortest distance to the selected point "$p_0$".

In step S37, the minimum distance computing module 23 computes a distance "$d_n$" between the triangle "a" and the triangle whose center point is "$p_0$".

In step S38, the storing module 24 stores the distance "$d_n$". In step S39, the judging module 25 judges whether all the points in the first point cloud have been selected. If no, the procedure returns to step S23 as described above for computing a plurality of distances "$d_n$". Otherwise, if all the points in the first point cloud have been selected, in step S40, the minimum distance computing module 23 computes an average distance of the distances "$d_n$". The average distance is the minimum distance between the two curved surfaces.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A computer-enabled method for computing minimum distances between two point clouds, the method being performed by execution of computer readable program code by at least one processor of at least one computer system, the method comprising steps of:
   (a) acquiring a first point cloud and a second point cloud using the at least one processor;
   (b) establishing a topological structure for the second point cloud to make points of the second point cloud confined in a plurality of related cubical grids using the at least one processor, comprising:
      (b1) identifying an outermost point on each surface edge of the second point cloud by analyzing coordinates values of the points in the second point cloud;
      (b2) creating a cubical figure that can confine the second point cloud according to the outmost points;
      (b3) deriving a length, a width and a height of the cubical figure;
      (b4) dividing the cubical figure into the plurality of cubical grids according to the length, the width, and the height of the cubical figure and an axes interval step preconfigured by a user; and
      (b5) configuring serial numbers for the cubical grids to identify the cubical grids;
   (c) selecting a point, which has not been selected, from the first point cloud using the at least one processor;
   (d) searching one or more cubical grids from the related cubical grids according to the topological structure, and computing a distance between the selected point and each of points which belong to the second point cloud and in the searched cubical grids to obtain a closest point from the second point cloud, which has a shortest distance to the selected point, wherein the shortest distance is one of the minimum distances between the two point cloud using the at least one processor;
   (e) repeating steps from (c) to (d) until all the points in the first point cloud have been selected.

2. The method described in claim 1, wherein the step (d) comprises:
   (d1) computing a distance D from the selected point perpendicular to a plane of a closest side-surface of the cubical figure;
   (d2) creating a measuring cube having a center of the selected point, and with a length of 2*(D+n*step), wherein n=n++, making the measuring cube cross with the cubical figure to form an intersection area, wherein cubical grids of the intersection area is the searched cubical grids;
   (d3) computing distances between the selected point and points which belong to the second point cloud and in the searched cubical grids, to obtain a closest point which has a shortest distance d to the selected point ;
   (d4) judging that whether d>(D+n*step) or not;
   (d5) ascertaining that the distance d is the minimum distance if d<(D+n*Step); and
   (d6) executing step (d2) to step (d5) if d>(D+n*step).

3. A computerized method for computing minimum distances between a point cloud and a curved surface, the method being performed by execution of computer readable program code by at least one processor of at least one computer system, the method comprising:
   (a) acquiring a first point cloud and a curved surface using the at least one processor;
   (b) constructing a mesh of triangular facets based on the curved surface using the at least one processor;
   (c) gathering vertexes of triangles of the mesh of triangular facets to form a second point cloud using the at least one processor;
   (d) establishing a topological structure for the second point cloud to make points of the second point cloud confined in a plurality of related cubical grids using the at least one processor, comprising:
      (d1) identifying an outermost point on each surface edge of the second point cloud by analyzing coordinates values of the points in the second point cloud;
      (d2) creating a cubical figure that can confine the second point cloud according to the outmost points;
      (d3) deriving a length, a width and a height of the cubical figure;
      (d4) dividing the cubical figure into the plurality of cubical grids according to the length, the width, and the height of the cubical figure and an axes interval step preconfigured by a user; and
      (d5) configuring serial numbers for the cubical grids to identify the cubical grids;
   (e) selecting a point, which has not been selected, from the first point cloud using the at least one processor;
   (f) searching one or more cubical grids from the related cubical grids according to the topological structure, and computing a distance between the selected point and each of points which belong to the second point cloud and in the searched cubical grids to obtain a closest point p from the second point cloud, which has a shortest distance to the selected point using the at least one processor;
   (g) computing distances between the selected point and triangles whose vertex is the point p to obtain a shortest distance, wherein the shortest distance is one of the minimum distances between the point cloud and the curved surface using the at least one processor; and
   repeating step (e) to step (g) until all the points in the first point cloud have been selected using the at least one processor.

4. The method as described in claim 3, wherein the step (f) comprises:
   (f1) computing a distance D from the selected point perpendicular to a plane of a closest side-surface of the cubical figure;
   (f2) creating a measuring cube having a center of the selected point, and with a length of 2*(D+n*step), wherein n=n++, making the measuring cube cross with the cubical figure to form an intersection area, wherein cubical grids of the intersection is the searched cubical grids;
   (f3) computing distances between the selected point and points which belong to the second point cloud and in the searched cubical grids, to obtain the closest pointer p which has a shortest distance d to the selected point;
   (f4) judging that whether d>(D+n*step) or not;
   (f5) ascertaining that the distance d is the minimum distance if d<(D+n*Step); and
   (f6) executing step (d2) to step (d5) if d>(D+n*step).

5. A computerized method for computing a minimum distance between two curved surfaces, the method being performed by execution of computer readable program code by at least one processor of at least one computer system, the method comprising:

(a) acquiring two curved surfaces using the at least one processor;
(b) constructing two meshes of triangular facets based on the two curved surfaces respectively using the at least one processor;
(c) gathering center points of triangles in one mesh of triangular facets to form a first point cloud, and gathering vertexes of triangles in other mesh of triangular facets to form a second point cloud using the at least one processor;
(d) establishing a topological structure for the second point cloud to make points of the second point cloud confined in a plurality of related cubical grids using the at least one processor, comprising:
  (d1) identifying an outermost point on each surface edge of the second point cloud by analyzing coordinates values of the points in the second point cloud;
  (d2) creating a cubical figure that can confine the second point cloud according to the outmost points;
  (d3) deriving a length, a width and a height of the cubical figure;
  (d4) dividing the cubical figure into the plurality of cubical grids according to the length, the width, and the height of the cubical figure and an axes interval step preconfigured by a user; and
  (d5) configuring serial numbers for the cubical grids to identify the cubical grids;
(e) selecting a point p0, which has not been selected, from the first point cloud using the at least one processor;
(f) searching one or more cubical grids from the related cubical grids according to the topological structure, and obtaining a point p from the second point cloud, which has the shortest distance to the point p0 by computing a distance between the point "p0" and each of points which belong to the second point cloud and in the searched cubical grids using the at least one processor;
(g) computing distances between the point p0 and triangles whose vertex is point p to obtain a triangle "a" which has a shortest distance to the point p0 using the at least one processor;
(h) computing a distances dn between the triangle a and the triangle whose center point is p0 using the at least one processor;
repeating steps from (e) to (i) for computing a plurality of distances dn until all the points in the first point cloud have been selected using the at least one processor; and
(j) computing an average distance of the distances dn, wherein the average distance is the minimum distance between the two curved surfaces using the at least one processor.

6. The method as described in claim 5, wherein the step (f) comprises:
  (f1) computing a distance D from the selected point perpendicular to a plane of a closest side-surface of the cubical figure;
  (f2) creating a measuring cube having a center of the selected point, and with a length of 2*(D+n*step), wherein n=n++, making the measuring cube cross with the cubical figure to form an intersection area, wherein cubical grids of the intersection area is the searched cubical grids;
  (f3) computing distances between the selected point and points which belong to the second point cloud and in the searched cubical grids, to obtain the closest point p which has a shortest distance d to the selected point;
  (f4) judging that whether d>(D+n*step) or not;
  (f5) ascertaining that the distance d is the minimum distance if d<(D+n*Step); and
  (f6) executing step (d2) to step (d5) if d>(D+n*step).

* * * * *